(12) United States Patent
Bauchot

(10) Patent No.: US 7,743,316 B2
(45) Date of Patent: Jun. 22, 2010

(54) METHOD AND SYSTEM FOR HIDING SENSITIVE DATA IN AN ELECTRONIC SPREADSHEET ENVIRONMENT

(75) Inventor: Frederic Bauchot, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 11/375,151

(22) Filed: Mar. 14, 2006

(65) Prior Publication Data

US 2007/0022368 A1    Jan. 25, 2007

(30) Foreign Application Priority Data

Jun. 29, 2005    (EP) .................................. 05300532

(51) Int. Cl.
*G06F 17/00* (2006.01)
(52) U.S. Cl. ...................... 715/212; 715/216; 715/267
(58) Field of Classification Search ................. 715/212, 715/216, 219, 267
See application file for complete search history.

(56) References Cited

U.S. PATENT DOCUMENTS

2004/0088650 A1* 5/2004 Killen et al. ................ 715/503
2006/0080594 A1* 4/2006 Chavoustie et al. ......... 715/503
2006/0080595 A1* 4/2006 Chavoustie et al. ......... 715/503
2008/0256432 A1* 10/2008 Sambandam et al. ........ 715/212

OTHER PUBLICATIONS

Hawley, David and Raina, Excel Hacks, O'Reily Media, Inc, Safari Books Online Mar. 24, 2004, Hack 78.*

* cited by examiner

*Primary Examiner*—Adam M Queler
(74) *Attorney, Agent, or Firm*—Schmeiser, Olsen & Watts; William H. Steinberg

(57) ABSTRACT

A method and system for hiding sensitive data in an electronic spreadsheet. A first output equation expresses output data as a function of at least one first input data and at least one first intermediary result. The at least one first and second intermediary result are assigned as content of intermediary cells of the spreadsheet. A second output equation is generated and expresses the output data as a function of a subset of the at least one first and second input data with no functional dependence on the plurality of intermediary results. Generation of the second output equation utilizes the first output equation and the plurality of first intermediary equations. The output data of the second output equation is assigned as content of an output cell of the spreadsheet. The content of the intermediary cells is removed, resulting in the plurality of intermediary results not being identifiable in the spreadsheet.

17 Claims, 11 Drawing Sheets

FIG. 2A

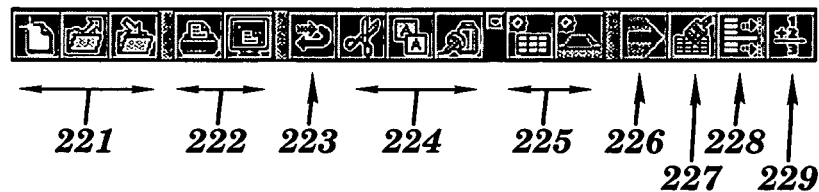
FIG. 2B
FIG. 2C
FIG. 2D

| variable | name | value |
|---|---|---|
| YEAR | year | 3 |
| DEVICE | dev | 120 |
| LOCATION | loc | 6 |

*FIG. 4A*

| variable | name | value |
|---|---|---|
| Server capacity | srvcap | 2500 |
| Server cost ($) | srvcost | 10000 |
| licence fee / device | sfwfee | 84 |
| efficiency | eff | 95% |
| sfw maintenance ratio | smr | 15% |
| admortization years | adm | 3 |
| hourly rate monitoring | hrmon | 55 |
| hourly rate problem | hrpb | 70 |
| hourly rate reporting | hrrep | 75 |
| yearly capa monitoring | ycmon | 450 |
| yearly capa problem | ycpb | 400 |
| yearly capa reporting | ycrep | 800 |
| travel per location | trv | 1000 |
| otc day per loc | otcday | 1.5 |
| hour per year | hiny | 1500 |

*FIG. 4B*

| variable | name | value |
|---|---|---|
| total contract value | tcv | 231091.9 |

*FIG. 4C*

| variable | name | value |
|---|---|---|
| monthly charge | mlc | 5798.908 |
| one time charge | otc | 22331.24 |
| mlc hardware | mlch | 13.33333 |
| mlc software | mlcs | 126 |
| mlc labor | mlcl | 5576.241 |
| mlc misc | mlcm | 83.33333 |
| otc hardware | otch | 0 |
| otc software | otcs | 10080 |
| otc labor | otcl | 6251.241 |
| otc misc | otcm | 6000 |
| otc labor days SM | otcldays | 9 |

*FIG. 4D*

| index | 1 | 2 | 3 | 4 | 5 | 6 |
|---|---|---|---|---|---|---|
| labor(index) | 5864.583 | 5571.354 | 5292.786 | 5028.147 | 4776.74 | 4537.903 |
| mon(index) | 1833.333 | 1741.667 | 1654.583 | 1571.854 | 1493.261 | 1418.598 |
| pb(index) | 2625 | 2493.75 | 2369.063 | 2250.609 | 2138.079 | 2031.175 |
| rep(index) | 1406.25 | 1335.938 | 1269.141 | 1205.684 | 1145.399 | 1088.129 |
| coef(index) | 1 | 0.95 | 0.9025 | 0.857375 | 0.814506 | 0.773781 |

*FIG. 4E*

| Equation | Type | Level | Rank |
|---|---|---|---|
| tcv=mlc*year*12+otc | 1 | 1 | 1 |
| mlc=mlch+mlcs+mlcl+mlcm | 2 | 2 | 2 |
| otc=otch+otcs+otcl+otcm | 2 | 2 | 3 |
| mlch=srvcost/srvcap*dev/adm/12 | 3 | 3 | 4 |
| mlcs=otcs*smr/12 | 2 | 3 | 5 |
| $mlcl = \dfrac{1}{year} * \sum_{i=1}^{i=year} labor(i)$ | 2 | 4 | 6 |
| mlcm=trv/12 | 3 | 3 | 7 |
| otch=0 | 3 | 3 | 8 |
| otcs=dev*sfwfee | 3 | 4 | 9 |
| otcl=otcldays*hrrep+mlcl | 2 | 3 | 10 |
| otcm=trv*loc | 3 | 3 | 11 |
| otcldays= otcday*loc | 3 | 4 | 12 |
| labor(i)=mon(i)+pb(i)+rep(i), 0<i<7 | 2 | 5 | 13-18 |
| mon(i)=dev/ycmon*hrmon*hiny*coef(i)/12, 0<i<7 | 2 | 6 | 19-24 |
| pb(i) =dev/ycpb*hrpb*hiny*coef(i)/12, 0<i<7 | 2 | 6 | 25-30 |
| rep(i) =dev/ycrep*hrrep*hiny*coef(i)/12, 0<i<7 | 2 | 6 | 31-36 |
| coef(1)=1 | 3 | 12 | 37 |
| coef(i)=coef(i-1)*eff, 1<i<7 | 2 | 7 to 11 | 38-42 |

FIG. 5

METHOD AND SYSTEM FOR HIDING SENSITIVE DATA IN AN ELECTRONIC SPREADSHEET ENVIRONMENT

BACKGROUND OF THE INVENTION

1. Technical Field

The present invention is directed to the field of electronic spreadsheets and more particularly to a method, system and computer program for hiding sensitive data within models in an electronic spreadsheet environment.

2. Related Art

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-left-hand corner), the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsborneIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require the recalculation of every relationship in the model with each change made. Electronic spreadsheet systems are well suited to solve "what-if" problems, that is, changing an input and seeing what happens to an output.

Electronic spreadsheets are commonly used for implementing costing and pricing tools, typically for service oriented offerings. Such tools are simply an implementation of a model (either a costing model or a pricing model) featuring a set of output data, based on a set of input data.

Costing/pricing models can be quite complex and the resulting spreadsheet tool can also be complex, involving a large number of formulas spreading across different sheets. Such formulas involve intermediary results, themselves involving either input data or other intermediary data. If a costing/pricing tool spreadsheet is disclosed to a person, this person can easily "reverse engineer" this tool to determine all the different intermediary results which are part of the model. Such intermediary results can contain confidential information that the costing/pricing tool spreadsheet author does not want to share with third parties. Nevertheless the costing/pricing tool spreadsheet author may want to share a tool which produces the output data when fed with the input data.

A typical example corresponding to this case is the following. Assume that a company X is currently delivering an offering through direct sales channel, and wants to rely on indirect channels, like business partners, to reach a wider opportunity base. If an internal cost/price model is disclosed to a business partner, then this business partner will easily access information that this company X refuses to disclose. On the contrary, every effort must be done by the company X to give to this business partner all the relevant tools streamlining the sales cycle, such as a costing/pricing tool.

This dilemma cannot be solved with conventional spreadsheet tools, since spreadsheet protection can easily be broken by cracks available on the Internet.

SUMMARY OF THE INVENTION

The present invention provides a computer-implemented method for hiding sensitive data in an electronic spreadsheet, wherein a first output equation expresses an output data as a function of at least one first input data and at least one first intermediary result, wherein a plurality of first intermediary equations relates the at least one first intermediary result to at least one second intermediary result and at least one second input data, wherein a plurality of input data denotes the at least one first input data and the at least one second input data collectively, wherein a plurality of intermediary results denote the at least one first intermediary result and the at least one second intermediary result collectively, said method comprising:

assigning the plurality of intermediary results as content of intermediary cells of the spreadsheet;

generating a second output equation that expresses the output data as a function of a subset of the plurality of input data with no functional dependence on the plurality of intermediary results, said generating the second output equation utilizing the first output equation and the plurality of first intermediary equations;

assigning the output data of the second output equation as content of an output cell of the spreadsheet; and after said assigning the output data, removing the content of the intermediary cells, resulting in the plurality of intermediary results not being identifiable in the spreadsheet.

The present invention provides a computer program stored in a memory of a computer system, said computer program comprising instructions that when executed by a processor of a computer system implement a method for hiding sensitive data in an electronic spreadsheet, wherein a first output equation expresses an output data as a function of at least one first input data and at least one first intermediary result, wherein a plurality of first intermediary equations relates the at least one first intermediary result to at least one second intermediary result and at least one second input data, wherein a plurality of input data denotes the at least one first input data and the at least one second input data collectively, wherein a plurality of intermediary results denote the at least one first intermediary result and the at least one second intermediary result collectively, said method comprising:

assigning the plurality of intermediary results as content of intermediary cells of the spreadsheet;

generating a second output equation that expresses the output data as a function of a subset of the plurality of input data with no functional dependence on the plurality of intermediary results, said generating the second output equation utilizing the first output equation and the plurality of first intermediary equations;

assigning the output data of the second output equation as content of an output cell of the spreadsheet; and after said assigning the output data, removing the content of the intermediary cells, resulting in the plurality of intermediary results not being identifiable in the spreadsheet.

The present invention provides a computer system comprising a processor and a memory coupled to the processor, said memory containing instructions that when executed by the processor implement a method for hiding sensitive data in an electronic spreadsheet, wherein a first output equation expresses an output data as a function of at least one first input data and at least one first intermediary result, wherein a plurality of first intermediary equations relates the at least one first intermediary result to at least one second intermediary result and at least one second input data, wherein a plurality of input data denotes the at least one first input data and the at least one second input data collectively, wherein a plurality of intermediary results denote the at least one first intermediary result and the at least one second intermediary result collectively, said method comprising:

assigning the plurality of intermediary results as content of intermediary cells of the spreadsheet;

generating a second output equation that expresses the output data as a function of a subset of the plurality of input data with no functional dependence on the plurality of intermediary results, said generating the second output equation utilizing the first output equation and the plurality of first intermediary equations;

assigning the output data of the second output equation as content of an output cell of the spreadsheet; and after said assigning the output data, removing the content of the intermediary cells, resulting in the plurality of intermediary results not being identifiable in the spreadsheet.

BRIEF DESCRIPTION OF THE DRAWINGS

FIG. 2A shows a spreadsheet notebook interface used in embodiments of the present invention.

FIG. 2B shows the toolbar component of the notebook interface shown in FIG. 2A.

FIGS. 2C and 2D show page identifiers for rapidly accessing and manipulating individual pages of the notebook interface shown in FIG. 2A.

FIGS. 4A, 4B, 4C, 4D, and 4E are tables respectively showing examples of scope data, model data, output data, a first set of intermediary result data, and a second set of intermediary result data.

FIG. 5 is a table depicting equations as relationships between data in the tables of FIGS. 4A, 4B, 4C, 4D, and 4E.

DETAILED DESCRIPTION OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system of the present invention provides, within an electronic spreadsheet, a tool implementing a costing/pricing model: giving to the tool user a limited visibility on the model internals, while maintaining full control of all the parameters, including the model data, for the tool author.

The method and system of the present invention specifies within an electronic spreadsheet, the cells containing either an output data, or a scope data or a model data.

The method and system of the present invention builds an internal table representing a sequence of intermediary results establishing a set of hierarchical relationships between the output data and both the scope and model data.

The method and system of the present invention establishes a relationship tying directly the output data from the scope and model data.

The method and system of the present invention specifies which model data is to be hidden.

The method and system of the present invention establishes a relationship tying directly the output data from the scope data and from the not hidden model data.

The method and system of the present invention removes cells referencing either intermediary results or hidden model data, so that the resulting electronic spreadsheet file only comprises the output data, the scope data and the not hidden model data.

The following description comprises the sections:

1. HARDWARE
2. INTERFACE
3. HIDING SENSITIVE DATA
4. EXAMPLE
5. FLOW CHART OF METHODOLOGY
6. PARTICULAR EMBODIMENT
7. DISCUSSION OF METHOD

1. Hardware

Figure 1A:
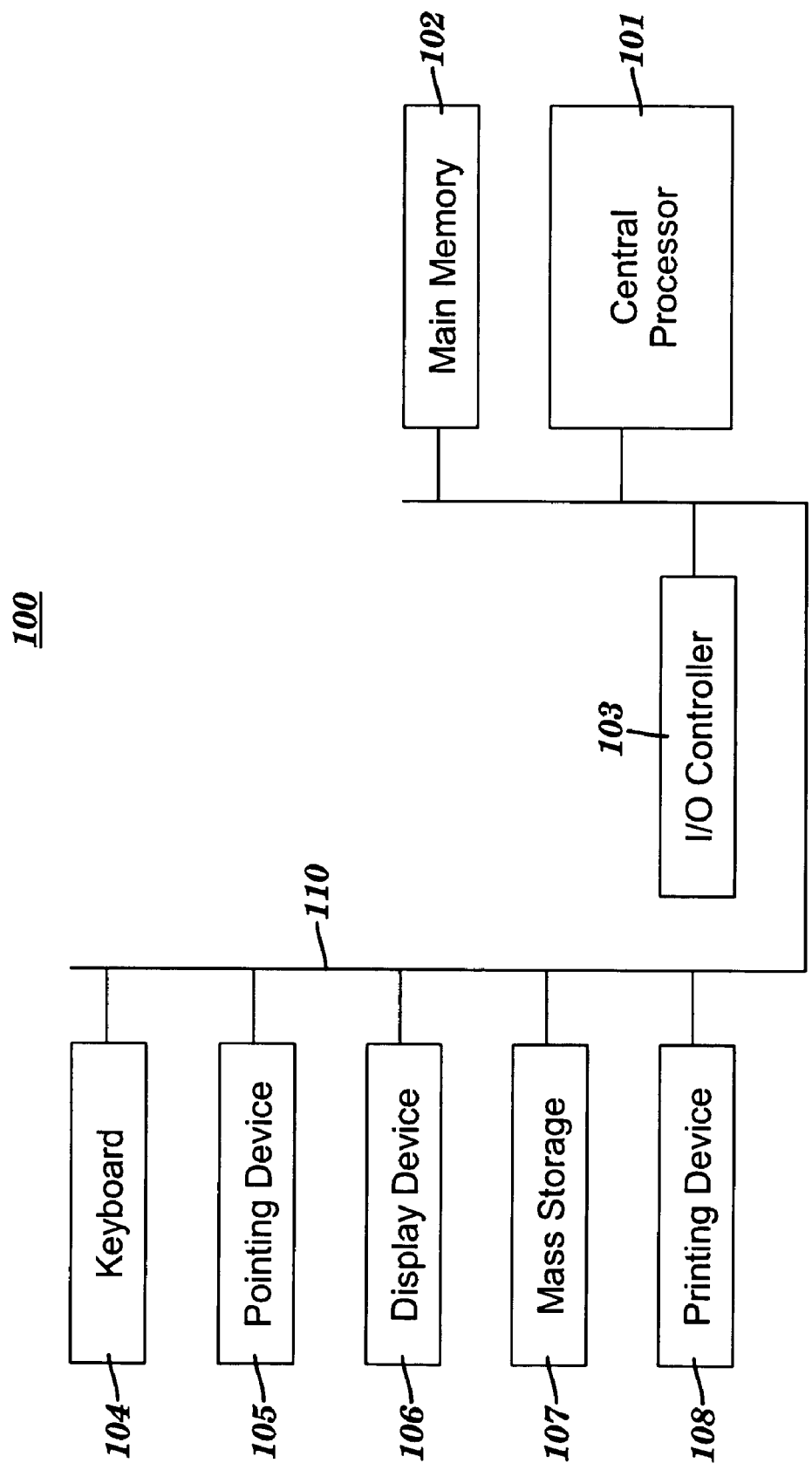
FIG. 1A is a block diagram of a computer system in which the present invention can be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture.

Figure 1B:
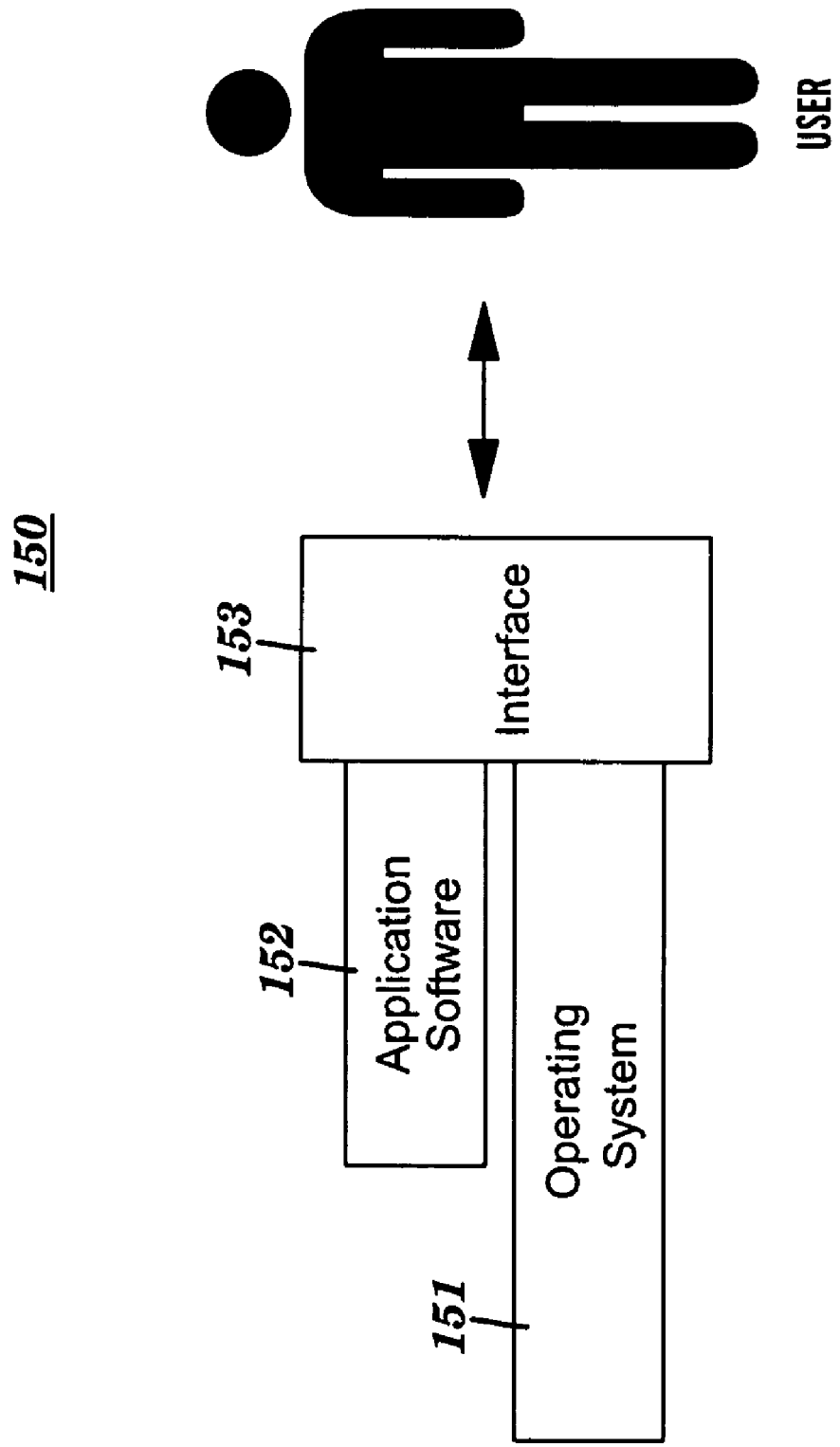
FIG. 1B is a block diagram of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which may be a graphical user interface (GUI), also serves to display results, whereupon the user may supply additional inputs or terminate the session. In one embodiment, operating system 151 and interface 153 are Microsoft Win95, available from Microsoft Corporation of Redmond, Wash. Application module 152, on the other hand, includes a spreadsheet notebook of the present invention as described in further detail herein below.

2. Interface

The following description will focus on the embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
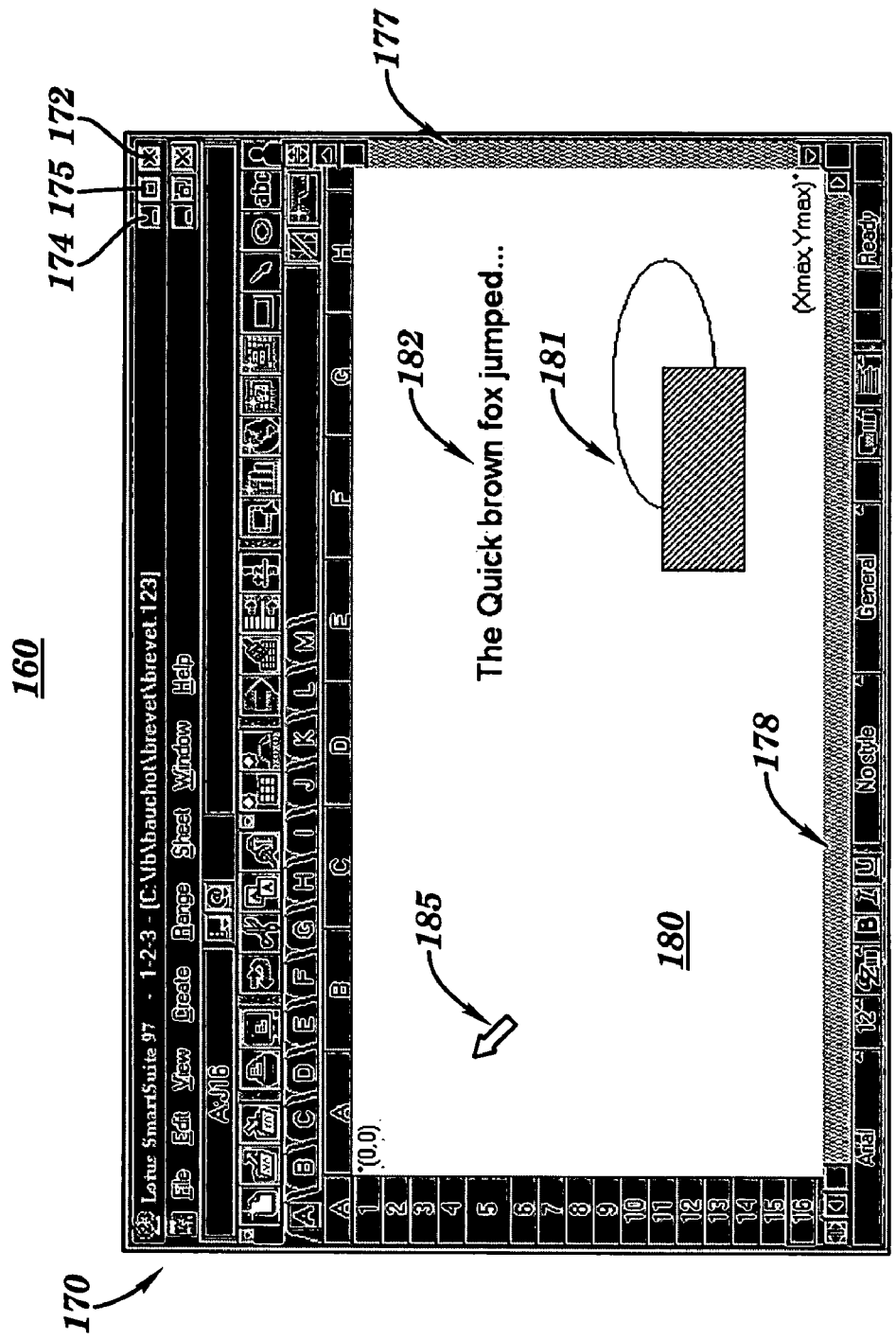
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or view port for the user to interact with data objects which reside within the computer system 100.

Windowing interface 160 includes a screen cursor or pointer 185 for selecting and otherwise invoking screen objects of interest. In response to user movement, signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art.

For example, Window 160 may be closed, resized, or scrolled by "clicking" (selecting) screen components 172, 174/5, and 177/8, respectively.

In one embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. The screen cursor control device 105 may be a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

Figure 2A:
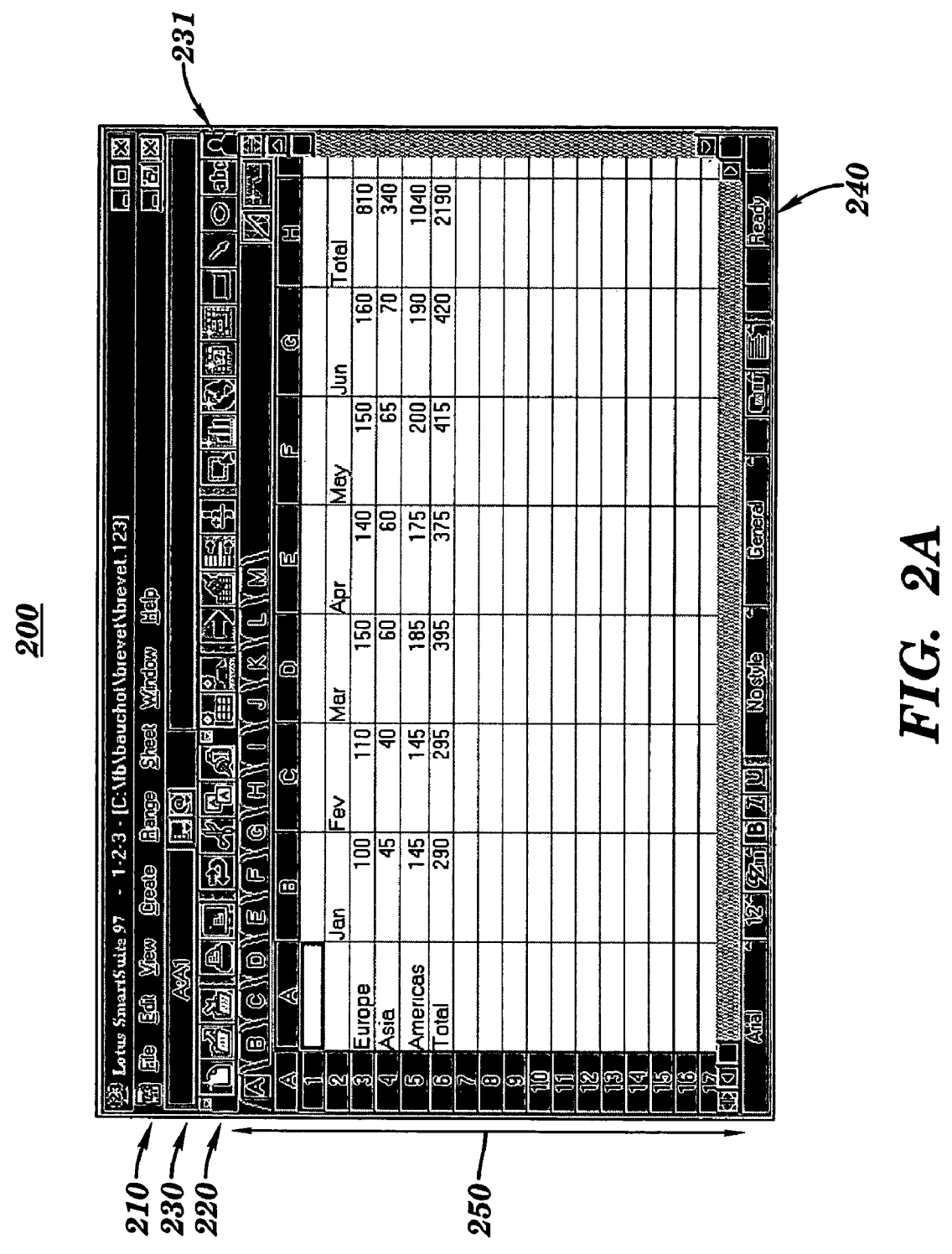

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a range selection button 226, a style copy button 227, a column resizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, resizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

As shown in FIGS. 2C-D, individual notebook pages are identified by page identifiers 260, preferably located along one edge of a notebook. In one embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet formulas. For example, when entering a formula referring to cells on another page, the user may simply use the descriptive page name in the formula itself (as described herein infra), thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

3. Hiding Sensitive Data

In embodiments described infra, a single output data is provided by the model under study. For real cases where several output data are featured, the model can be considered as a collection of different models, where each of them specifies a single output data.

The input data comprises scope data and model data. Scope data is specific to a quotation and quantifies the scope of service to be delivered (e.g., the number of objects to be managed for a remote management offering). Model data specifies parameters which are not scope dependent, but rather are model dependent (e.g., a labour rate, giving the hourly cost for a person with a given skill level).

The following notation and naming conventions are utilized herein.

OD corresponds to the output data.

$\{SD_i\}$ corresponds to the set of scope data. Here it is assumed that several of these scope data are part of the model under study. Scope data is identified by an index i.

$\{MD_j\}$ corresponds to the set of model data. Here it is assumed that several of these model data are part of the model under study. Model data is identified by an index j.

$\{IR_k\}$ corresponds to the set of intermediary results. Here it is assumed that several of these intermediary results are part of the model under study. Intermediary results are identified by an index k.

The different relationships defined between the above data correspond to the different formulas found within the electronic spreadsheet cells hosting these data. These relationships are also formally represented by mathematical functions, as follows:

$$OD = F_0(SD_i, MD_j, IR_k) \quad (1)$$

All the available input data ($\{SD_i\}$ and $\{MD_j\}$) are not necessarily present in the above formula. The same remark also applies for the formula translating the relationship defining the intermediary data (see infra).

$$IR_{k_1} = F_{k_1}(SD_i, MD_j, IR_k) \quad (2)$$

It is assumed that there is no circular reference (that is a data which is a function of itself) in the electronic spreadsheet; thus some intermediary results are such that:

$$IR_{k_2} = F_{k_2}(SD_i, MD_j) \quad (3)$$

Thus, the intermediary results in equation (3) rely only on the input data. Equations (1), (2), and (3) will be referred to as equations of category (1), (2), and (3), respectively.

Figure 3:
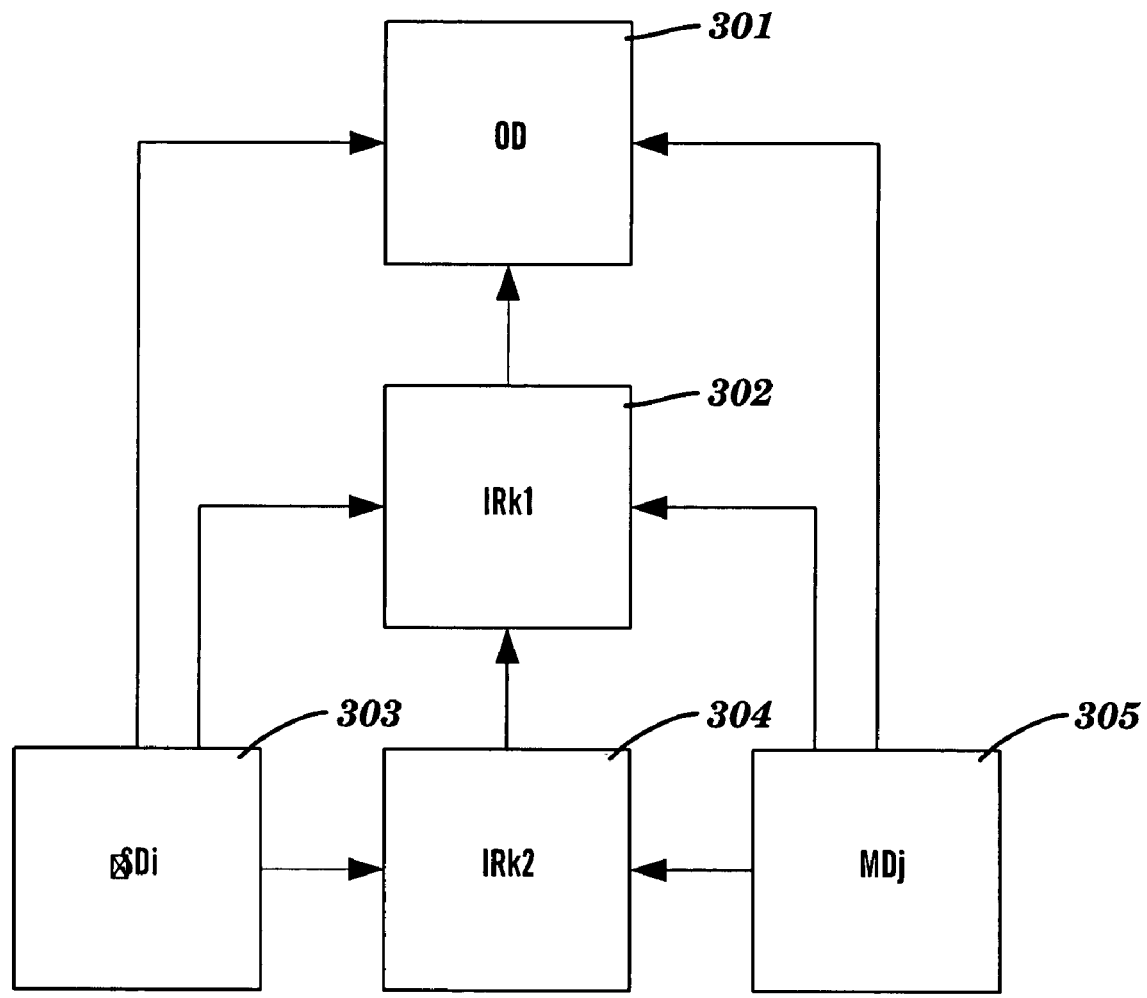
FIG. 3 is a block diagram illustrating the hierarchical relationships between input data and output data.

Accordingly, the set of relationships can be formalized through a tree structure, as shown in FIG. 3. The tree structure in FIG. 3 defines a hierarchy between a lowest level, corresponding to the output data OD 301, and arbitrarily set to 1, and a highest level corresponding to an intermediary result which is the deeper in the sequence of antecedents. Within the case illustrated by the FIG. 3, a first intermediary result $IR_{k_1}$ 302 is at level 2, while the level 3 corresponds to a second intermediary result $IR_{k_2}$ 304, to a scope data $SD_i$ 303 and to a model data $MD_j$ 305. Conventional techniques, not described herein, are available to assign such levels.

The present invention relies on computer algebra along the following sequence of steps A, B, C, and D.

A. The first step A comprises building a relationship (equation) where the output data only depends on the input data, as follows:

$$OD = F(SD_i, MD_j) \quad (4)$$

This can be done by recursively replacing in each equation of category (2), $IR_{k_1} = F_{k_1}(SD_i, MD_j, IR_k)$, each argument $IR_k$ by the corresponding equation of either category (2) $IR_{k_1} = F_{k_1}(SD_i, MD_j, IR_k)$ or category (3) $IR_{k_2} = F_{k_2}(SD_i, MD_j)$. For instance, if each argument $IR_k$ is replaced by an equation of category (2), $IR_{k_1} = F_{k_1}(SD_i, MD_j, IR_k)$, the step will comprise building the following relationships $IR_{k_1} = F_{k_1}(SD_i, MD_j, F_k(SD_i, MD_j, IR_k))$. In the present case, all the resulting equations are of category (2). The next step comprises replacing each argument $IR_k$ of each equation of category (2) by an equation either of category (2) or (3). This iterative process ends when each argument can be defined by an equation of category (3) and when the output data can be represented in an equation of category (4).

If each argument $IR_k$ is replaced by an equation of category (3), $IR_{k_2} = F_{k_2}(SD_i, MD_j)$, the step comprises building the following relationships $IR_{k_1} = F_{k_1}(SD_i, MD_j, F_k(SD_i, MD_j))$ which are equations of category (3). The next step comprises replacing in equation of category (1) all the arguments $IR_k$ by the corresponding equations of category (3) to obtain an equation of category (4).

If at least one argument $IR_k$ is replaced by an equation of category (2), $IR_{k_1} = F_{k_1}(SD_i, MD_j, IR_k)$, at least one of the resulting equations will be of category (2). The next step comprises replacing each argument $IR_k$ of each equation of category (2) by an equation either of category (2) or (3). This iterative process ends when each argument can be defined by an equation of category (3) and when the output data can be represented in an equation of category (4).

B. The second step B comprises simplifying the equation (4) OD=F(SD$_i$, MD$_j$) through conventional techniques available in computer algebra, such as factorization. Note that these two first steps A and B can be advantageously nested, so that the formula can be simplified as soon as possible.

C. The third step C comprises substituting within the equation (4) OD=F(SD$_i$, MD$_j$), the model data to be hidden by their values, in order to hide this model data from the user, D. The fourth step D comprises simplifying (via computer algebra) the resulting formula. For instance, if all the model data are replaced by their values, then the resulting model will be reduced to what is targeted: a formula where only scope data are used as parameters, as follows:

$$OD=F(SD_i) \quad (5)$$

The resulting new formula (5) OD=F(SD$_i$) supersedes the set of formulas corresponding to the equations (1), (2) and (3). These equations (1), (2) and (3) can be simply removed from the electronic spreadsheet file by deleting the content of the corresponding cells. Obviously the resulting data needs to be recorded in a new file, to avoid the loss of the root information made by the equations (1), (2) and (3).

Computer algebra is today a well known technique, available either within commercial product such as "Maple", "Mathematica", "MatLab", and "MuPad", or as sharewares like "Yacas". Such techniques are available in tools that can be easily interfaced by office applications, such as electronic spreadsheets, due to industry standard Application Programming Interfaces which can be invoked by macros. The present invention does not assume one particular tool related to formula simplification (e.g., through factorization techniques) or formula evaluation, since most of the available tools share a wide range of similar functions which fit the needs of the present invention.

4. Example

FIGS. 4A, 4B, 4C, 4D, and 4E are tables respectively showing examples of scope data, model data, output data, a first set of intermediary result data, and a second set of intermediary result data.

The scope data of FIG. 4A corresponds to: the duration of the service contract (scope data "year"), the number of managed network devices (scope data "dev"), and the number of customer locations (scope data "loc").

The model data of FIG. 4B corresponds to multiple variables specifying different cost drivers, such as: hourly labor rates (model data "hrmon", "hrpb" and "hrrep"), hardware charges (model data "srvcost"), and software license charges (model data "sfwfee").

The output data of FIG. 4C corresponds to a single output data giving the total contract value (output data "tcv").

The intermediary results are represented by FIGS. 4D and 4E. FIG. 4D comprises intermediary results corresponding to either monthly charges or one time charges. FIG. 4E comprises intermediary results corresponding to yearly dependent cost drivers.

FIG. 5 is a table depicting equations as relationships between data in the tables of FIGS. 4A, 4B, 4C, 4D, and 4E. In FIG. 5, the relationships established between the output data, the intermediary results, and the input data are specified according to the content of multiple cells within the cost model spreadsheet. Each equation in the table of FIG. 5 is identified through a type, a level, and a rank.

Figure 6:
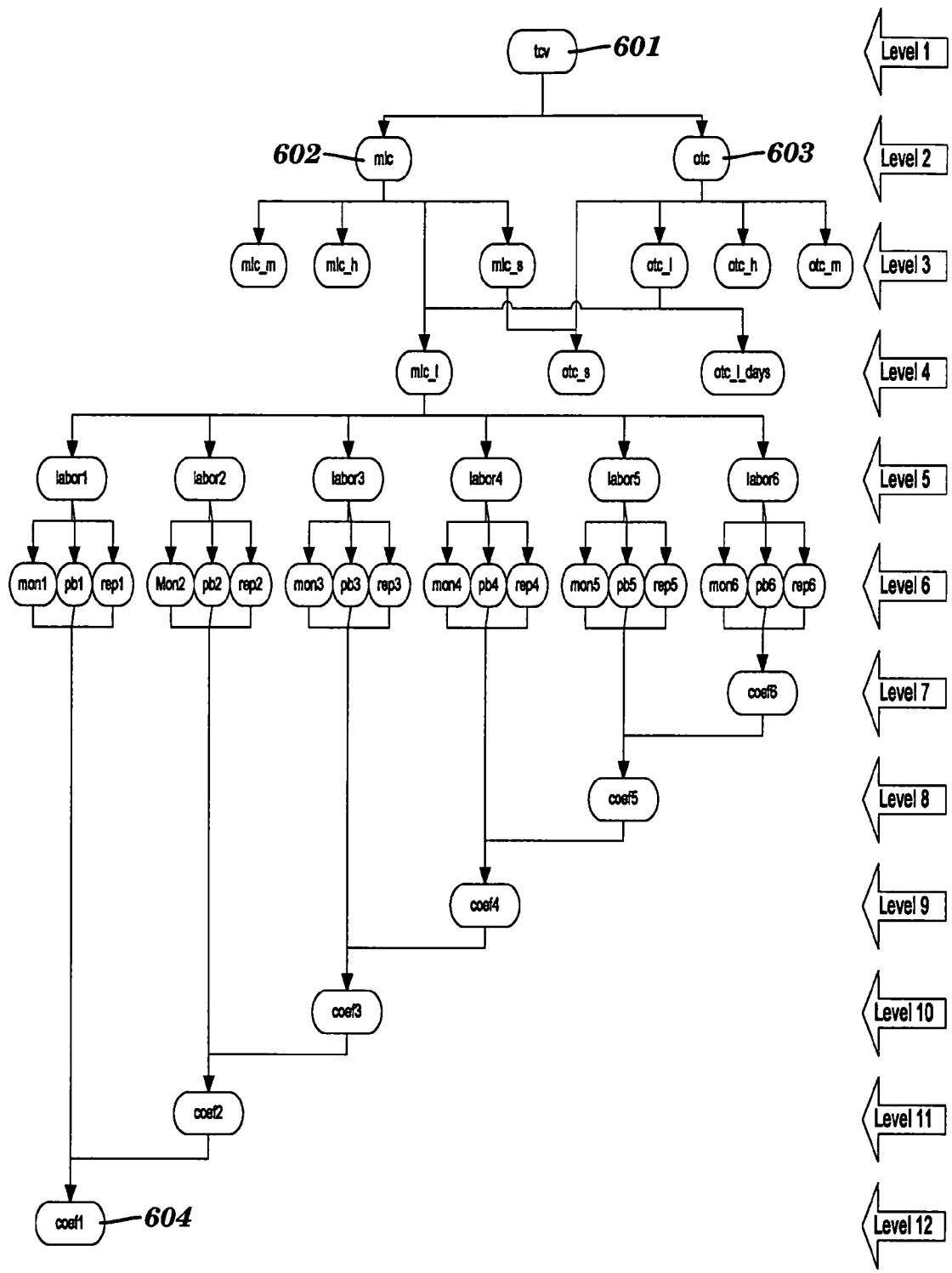
FIG. 6 is a tree structure depicting the equations in the table of FIG. 5 at various hierarchical levels.

FIG. 6 is a tree structure in the form of a tree hierarchy depicting the equations in the table of FIG. 5 at various hierarchical levels. In FIG. 6, each equation of FIG. 5 is represented as a node of the tree hierarchy. The equation level (1, 2, 3, 4, ...) in FIG. 5 is a hierarchical level within the tree hierarchy of FIG. 6. The equation type of 1, 3, and 2 in FIG. 5 respectively denotes a root node, a leaf node, and any other node (i.e., not a root node or leaf node) of the tree hierarchy. A root node is at the lowest level (1) of the tree hierarchy. A leaf node is a terminal node of the tree hierarchy.

The tree in FIG. 6 specifies the levels defining the hierarchy between the different intermediary results. For instance, the highest hierarchical level 1 corresponds to the output data "tcv" 601. The second level corresponds to the intermediary results "mlc" 602 and "otc" 603, and so on up to the last hierarchical level 12 corresponding to the intermediary result "coef1" 604 which is listed as a leaf node of equation type 3 in FIG. 5.

For instance the first equation tcv=mlc*year*12+otc (rank equal to 1) in FIG. 5 translates the relationship used to determine the output data "tcv" from the scope data "year", and from the intermediary results "mlc" and "otc". This first equation for tcv is of type 1, because the first equation is a root node at level 1.

The present example is described in terms of the steps A, B, C, and D as follows.

Steps A and B

In the present example, the first two steps A and B, as previously described, are performed as follows, starting with the equation of highest level 12, that is "coef(1)=1", followed down to level 7:

$$coef(1)=1$$

$$coef(2)=coef(1) \times eff = 1 \times eff = eff$$

$$coef(3)=coef(2) \times eff = eff \times eff = eff^2$$

$$coef(4)=coef(3) \times eff = eff^2 \times eff = eff^3$$

$$coef(5)=coef(4) \times eff = eff^3 \times eff = eff^4$$

$$coef(6)=coef(5) \times eff = eff^4 \times eff = eff^5$$

Note that in the previous equalities, steps A and B have been nested to allow the computer algebra algorithm to perform the simplification of the form $a^{n-1} \times a = a^n$.

Then, going on with the equations of level 6, starting with rank 31 to 36, and using the variable "i" as an integer between values 1 and 6:

$$rep(i) = \frac{dev \times hrrep \times hiny}{ycrep \times 12} \times coef(i) = \frac{dev \times hrrep \times hiny}{ycrep \times 12} \times eff^{i-1}$$

Similarly for the equations of rank 25 to 30:

$$pb(i) = \frac{dev \times hrpb \times hiny}{ycpb \times 12} \times coef(i) = \frac{dev \times hrpb \times hiny}{ycpb \times 12} \times eff^{i-1}$$

and for the equations of rank 19 to 24:

$$mon(i) = \frac{dev \times hrmon \times hiny}{ycmon \times 12} \times coef(i) = \frac{dev \times hrmonp \times hiny}{ycmon \times 12} \times eff^{i-1}$$

yielding for the equations of level 5 (rank 13 to 18):

$$labor(i) = rep(i) + pb(i) + mon(i)$$

$$labor(i) = \frac{dev \times hrrep \times hiny}{ycrep \times 12} \times eff^{i-1} + \frac{dev \times hrpb \times hiny}{ycpb \times 12} \times eff^{i-1} + \frac{dev \times hrmon \times hiny}{ycmon \times 12} \times eff^{i-1}$$

$$labor(i) = \frac{dev \times hiny}{12} \times \left(\frac{hrrep}{ycrep} + \frac{hrpb}{ycpb} + \frac{hrmon}{ycmon}\right) \times eff^{i-1}$$

Then the equations of level 4 can be written as:

$$otcldays = otcday \times loc$$

$$otcs \times dev \times sfwfee$$

$$mlcl = \frac{1}{year} \times \sum_{i=1}^{i=year} labor(i)$$

$$= \frac{1}{year} \times \sum_{i=1}^{i=year} \frac{dev \times hiny}{12} \times \left(\frac{hrrep}{ycrep} + \frac{hrpb}{ycpb} + \frac{hrmon}{ycmon}\right) \times eff^{i-1}$$

$$mlcl = \frac{dev \times hiny}{12 \times year} \times \left(\frac{hrrep}{ycrep} + \frac{hrpb}{ycpb} + \frac{hrmon}{ycmon}\right) \times \sum_{i=1}^{i=year} eff^{i-1}$$

$$mlcl = \frac{dev \times hiny}{12 \times year} \times \left(\frac{hrrep}{ycrep} + \frac{hrpb}{ycpb} + \frac{hrmon}{ycmon}\right) \times \frac{1 - eff^{year}}{1 - eff}$$

Then the equations of level 3 can be written as:

$$mlcm = \frac{trv}{12}$$

$$mlch = \frac{srvcost \times dev}{srvcap \times adm \times 12}$$

$$mlcs = otcs \times \frac{smr}{12} = dev \times sfwfee \times \frac{smr}{12}$$

$$otcm = trv \times loc$$

$$otch = 0$$

$$otcl = otcldays \times hrrep + mlcl$$

$$otcl = otcday \times loc \times hrrep + \frac{dev \times hiny}{12 \times year} \times \left(\frac{hrrep}{ycrep} + \frac{hrpb}{ycpb} + \frac{hrmon}{ycmon}\right) \times \frac{1 - eff^{year}}{1 - eff}$$

Then the equations of level 2 can be written as:

$$otc = otch + otcs + otcl + otcm$$

$$otc = dev \times sfwfee + otcday \times loc \times hrrep + trv \times loc + \frac{dev \times hiny}{12 \times year} \times \left(\frac{hrrep}{ycrep} + \frac{hrpb}{ycpb} + \frac{hrmon}{ycmon}\right) \times \frac{1 - eff^{year}}{1 - eff}$$

$$otc = loc \times [otcday \times hrrep + trv] + dev \times \left[sfwfee + \frac{hiny}{12 \times year} \times \left(\frac{hrrep}{ycrep} + \frac{hrpb}{ycpb} + \frac{hrmon}{ycmon}\right) \times \frac{1 - eff^{year}}{1 - eff}\right]$$

$$mlc = mlch + mlcs + mlcl + mlcm$$

$$mlc = \frac{srvcost \times dev}{srvcap \times adm \times 12} + dev \times sfwfee \times \frac{smr}{12} + \frac{dev \times hiny}{12 \times year} \times \left(\frac{hrrep}{ycrep} + \frac{hrpb}{ycpb} + \frac{hrmon}{ycmon}\right) \times \frac{1 - eff^{year}}{1 - eff} + \frac{trv}{12}$$

$$mlc = \frac{dev}{12} \times \left[\frac{srvcost}{srvcap \times adm} + sfwfee \times smr + \frac{hiny}{year} \times \left(\frac{hrrep}{ycrep} + \frac{hrpb}{ycpb} + \frac{hrmon}{ycmon}\right) \times \frac{1 - eff^{year}}{1 - eff}\right] + \left[\frac{trv}{12}\right]$$

Then the formula of level 1, giving the output data "tcv", can be written as:

$$tcv = mlc \times year \times 12 + otc$$

$$tcv = \left(\frac{dev}{12} \times \left[\frac{srvcost}{srvcap \times adm} + sfwfee \times smr + \frac{hiny}{year} \times \left(\frac{hrrep}{ycrep} + \frac{hrpb}{ycpb} + \frac{hrmon}{ycmon}\right) \times \frac{1 - eff^{year}}{1 - eff}\right] + \left[\frac{trv}{12}\right]\right) \times$$

$$year \times 12 + \cdots loc \times [otcday \times hrrep + trv] +$$

$$dev \times \left[sfwfee + \frac{hiny}{12 \times year} \times \left(\frac{hrrep}{ycrep} + \frac{hrpb}{ycpb} + \frac{hrmon}{ycmon}\right) \times \frac{1 - eff^{year}}{1 - eff}\right]$$

$$tcv = loc \times [otcday \times hrrep + trv] + year \times [trv] +$$

$$\cdots dev \times \left[sfwfee + year \times \left(\frac{srvcost}{srvcap \times adm} + sfwfee \times smr\right) + hiny \times \left(\frac{hrrep}{ycrep} + \frac{hrpb}{ycpb} + \frac{hrmon}{ycmon}\right) \times \frac{1 - eff^{year}}{1 - eff} \times \left(1 + \frac{1}{12 \times year}\right)\right]$$

which shows that the output data "tcv" is derived from the input data ("year", "dev", "loc") by a function of the form:

$$tcv = loc \times A + year \times B + dev \times C + dev \times year \times D + \frac{dev}{year} \times E + dev \times F^{year} \times G + \frac{dev}{year} \times H^{year} \times I$$

where the capital letters represent constants.

Step C

Let assume now that the objective is to hide all the model data, except the "trv" one which specifies the average cost for travelling to the customer premises. The step C substitutes every model data (but "trv") in the former formula, by its corresponding value, as follows:

$$tcv = loc \times [1.5 \times 75 + trv] + year \times [trv] +$$

$$\cdots dev \times \left[84 + year \times \left(\frac{10000}{2500 \times 3} + 84 \times 15\%\right) + 1500 \times \left(\frac{75}{800} + \frac{70}{400} + \frac{55}{450}\right) \times \frac{1 - 0.95^{year}}{1 - 0.95} \times \left(1 + \frac{1}{12 \times year}\right)\right]$$

-continued $$tcv = loc \times [1.5 \times 75 + trv] + year \times [trv] +$$
$$\cdots dev \times \left[84 + year \times \left(\frac{10000}{2500 \times 3} + 84 \times 15\%\right) +\right.$$
$$\left.1500 \times \left(\frac{75}{800} + \frac{70}{400} + \frac{55}{450}\right) \times \frac{1 - 0.95^{year}}{1 - 0.95} \times \left(1 + \frac{1}{12 \times year}\right)\right]$$

Step D

The last step consists in feeding the computer algebra engine with the above formula, in order to perform the simplification of the expressions between brackets. This results into the following formula:

$$tcv = loc \times [112.5 + trv] + year \times [trv] + dev \times year \times [13.933] +$$
$$\frac{dev}{year} \times [977.43055] \cdots - \frac{dev}{year} \times 0.95^{year} \times [977.43055] +$$
$$dev \times [11813.166] - dev \times 0.95^{year} \times [11729.166]$$

It is clear that nobody can "reverse engineer" this kind of formula to sketch the underlying model and cost drivers. So if a spreadsheet cell is filled with this formula, and if all the cells hosting intermediary results are removed, then the present problem is solved. Spreadsheet file according to the present invention comprises a faithful and working version of the original model, without disclosing any of its internal, sensitive information.

5. Flow Chart of Methodology

Figure 7:
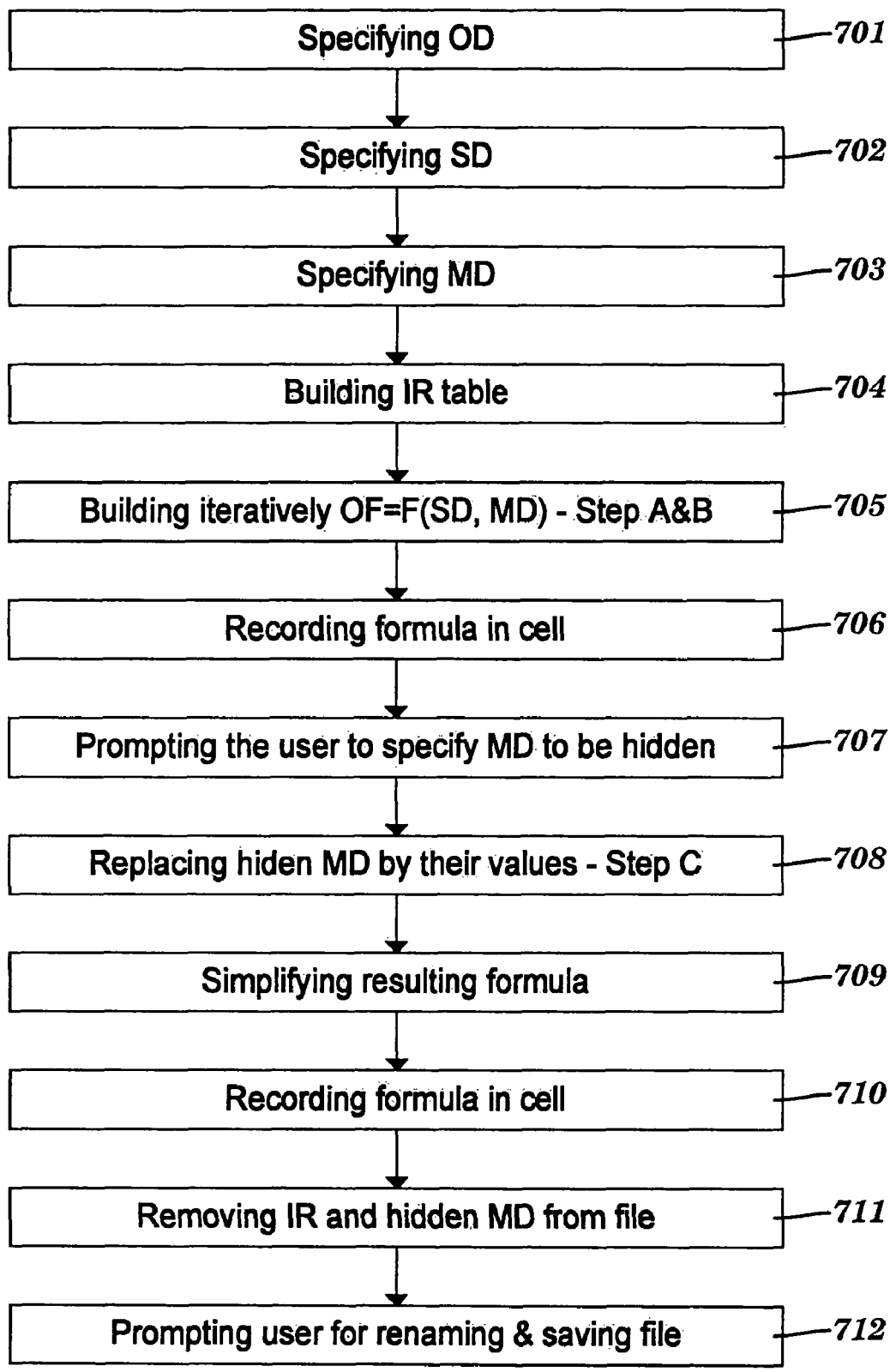
FIG. 7 is a flow chart depicting methodology for embodiments of the present invention.

FIG. 7 is a flow chart depicting methodology for embodiments of the present invention.

At step 701, the spreadsheet user is prompted to specify the cell which comprises the Output Data OD. If a single output data is produced by the model, then a single cell must be specified within the electronic spreadsheet file. For a model producing a plurality of output data, the present method can be repeated for each individual output data.

At step 702, the spreadsheet user is prompted to specify the cells corresponding to the Scope Data $\{SD_i\}$ At step 703, the spreadsheet user is prompted to specify the cells corresponding to the Model Data $\{MD_i\}$ At step 704, an Intermediary Result Table (IRT) is created to record the set of intermediary results IR in the spreadsheet and to link the output data with both the Scope Data and the Model Data. This IRT is made of a collection of records, each record comprising the following fields: a Cell Address (CA) field, but if the cell is named then the cell name can replaces the cell address; a Cell Type (CT) field; a Cell Level (CL) field; Cell Content (CC) field.

The IRT is built by starting with the first record corresponding to the output data, where the Cell Level defaults to 1. The creation of the following records comprises the steps of: parsing the formulas of the CC (Cell Content) field of already existing records; and identifying in the parsed formulas, variables which are neither a SD (Scope Data) nor a MD (Model Data). Such variables correspond to Intermediary Results (IR). For each created record corresponding to a given IR, the value given to the CL (Cell Level) field is equal to the highest value of the CL field of the parent IR, incremented by 1. This process completes when for all the created records, the formula points to variables which are either SD or MD or recorded IR.

The table of FIG. 5 is an example of an IRT.

At step 705, the computer algebra engine is fed with the formulas comprised in the CC fields of the IRT in order to build a formula of type (4) OD=F(SD$_i$, MD$_j$). This is also done iteratively by starting feeding the computer algebra engine with the formulas CC of highest CL, and simplifying the last fed CC. This sequence of steps is illustrated in the previous example.

At step 706, the resulting formula built by the computer algebra engine is recorded in a cell of the spreadsheet file, for instance within a cell previously void, or as a new version of the cell previously containing OD (Output Data).

At step 707, the electronic spreadsheet user is prompted to specify which are the MD (Model Data) which need to be hidden. This can be done through conventional user interface techniques, such as pop-up windows and dialog box, or this can even be reduced to a void step, assuming by default that all the MD must be hidden (if it is not the case, then an input data is specified as Scope data in step 702).

At step 708, the hidden MD are replaced by their values, within the formula recorded at step 706.

At step 709, the computer algebra engine is fed with this formula (where hidden MD are replaced by their values) for simplification.

At step 710, the simplified formula returned by the computer algebra engine is recorded in a cell of the spreadsheet file, with the same approach as for step 706.

At step 711, all the IR (intermediary result) cells (including obviously the original OD cell) and all the hidden MD cells are removed from the electronic spreadsheet file.

At step 712, the user is prompted for renaming and saving the resulting updated file.

6. Particular Embodiment

In a conventional costing/pricing tool, end users can easily determine all the different intermediary results which are part of the model. Such intermediary results can contain confidential information (typically the model data) that the costing/pricing tool spreadsheet author does not want to share with third parties. Nevertheless the author may want to share a tool which produces the output data when fed with the scope data.

The present invention can be advantageously used to share a costing/pricing model with third parties without disclosing intermediary results can contain confidential information (typically the model data).

For instance a company X is currently delivering an offering through direct sales channel, and wants to rely on indirect channels, like business partners, to reach a wider opportunity base. With the present invention, it is possible to share with one or a plurality of business partners, an internal cost/price model while preserving the confidentiality of sensible information.

7. Discussion of Method

The method of the present invention is next discussed in a formulation as illustrated by the detailed worked-out example, discussed supra.

A first output equation (tcv=mlc×year×12+otc) expresses an output data (tcv) as a function of at least one first input data (year) and at least one first intermediary result (mlc, otc). A plurality of first intermediary equations (nodes in levels 2-12 of FIG. 6) relates the at least one first intermediary result (mlc, otc) to at least one second intermediary result (mlcm, mlch, . . . , coef2, coef1) and at least one second input data (dev, loc, srvcap, . . . , hiny). A plurality of input data (year, dev, loc, srvcap, . . . , hiny) denotes the at least one first input data (year) and the at least one second input data (dev, loc, srvcap, . . . , hiny) collectively. A plurality of intermediary results (mlc, otc, mlcm, mlch, . . . , coef2, coef) denotes the at least one first intermediary result (mlc, otc) and the at least one second intermediary result (mlcm, mlch, . . . , coef2, coef) collectively.

The plurality of intermediary results are assigned as content of intermediary cells of the spreadsheet (Intermediate Result Table in step 704 of FIG. 7).

A second output equation (tcv=(dev/12 . . . )×year× 12+ . . . , namely the level 1 equation for tcv resulting from execution of steps A and B) is generated, wherein the second output equation expresses the output data (tcv) as a function of a subset of the plurality of input data with no functional dependence on the plurality of intermediary results. See second output equation of tcv=[1.5×75+trv]+year×[trv]+ . . . in step D, wherein the subset of the plurality of input data includes the scope data (year, dev, loc) and excludes all model data except trv, and wherein the second output equation has no functional dependence on the plurality of intermediary results (mlc, otc, mlcm, mlch, . . . , coef2, coef). Generation of the second output equation utilizes the first output equation (tcv=mlc×year×12+otc) and the plurality of first intermediary equations (nodes in levels 2-12 of FIG. 6).

The output data (tcv) of the second output equation is assigned as content of an output cell of the spreadsheet (see step 706 of FIG. 7).

After the output data is assigned, the content of the intermediary cells is removed, resulting in the plurality of intermediary results not being identifiable in the spreadsheet (see step 711 of FIG. 7).

Generating the second output equation may comprise recursively eliminating the at least one second intermediary result (mlcm, mlch, . . . , coef2, coef1) from the plurality of first intermediary equations (nodes in levels 2-12 of FIG. 6) to transform the plurality of first intermediary equations into at least one second intermediary equation (level 2 equation for otc and mlc resulting from execution of steps A and B) that expresses the at least one first intermediary result (mlc, otc) in terms of the at least one second input data (dev, loc, srvcap, hiny) with no dependence on the at least one second intermediary result (mlcm, mlch, . . . , coef2, coef). The at least one first intermediary result from the at least one second intermediary equation is substituted into the first output equation (tcv=mlc×year×12+otc) to generate the second output equation (tcv=(dev/12 . . . )×year×12+ . . . , namely the level 1 equation for tcv resulting from execution of steps A and B).

The subset of the plurality of input data may not include at least one selected input data of the plurality of input data. Generation of the second output equation may comprise replacing each selected input data by its value such that the second output equation in the output cell does not indicate a functional dependence on the at least one selected input data. In the detailed example, the at least one selected input data replaced by its values was all of the model data except trv.

While the invention has been particularly shown and described with reference to a preferred embodiment, it will be understood that various changes in form and detail may be made therein without departing from the spirit, and scope of the invention.

What is claimed is:

1. A computer-implemented method for hiding sensitive data in an electronic spreadsheet, said method comprising:
providing a first output equation that expresses an output data as a function of at least one scope input variable whose value intermediate result, at least one model input variable of a model consisting of a cost or pricing model pertaining to the service to be delivered, and at least one first intermediary result, wherein a plurality of first intermediary equations relates the at least one first intermediary result to at least one second intermediary result and one or more model input variables of the model, wherein a plurality of intermediary results denote the at least one first intermediary result and the at least one second intermediary result collectively;
assigning the plurality of intermediary results as content of intermediary cells of the spreadsheet;
a processor of a computer system generating a second output equation that expresses the output data as a function of the at least one scope input variable, at least one additional scope input variable whose value quantifies an additional scope of the service to be delivered, and a plurality of model input variables of the model, wherein the second output equation has no functional dependence on the plurality of intermediary results, and wherein said generating the second output equation comprises utilizing the first output equation and the plurality of first intermediary equations;
in the generated second output equation, said processor replacing each model input variable of the plurality of model input variables by its value to hide each model input variable of the plurality of model input variables by its value and not replacing any scope input variable of the at least one scope input variable and the at least one additional scope input variable by its value, resulting in a third output equation;
after said replacing, said processor simplifying the third output equation via a computer algebra engine, resulting in a fourth output equation that expresses the output data as a function of the at least one scope input variable and the at least one additional scope input variable, wherein the fourth output equation has no functional dependence on any model input variable of the model;
assigning the output data of the fourth output equation as content of an output cell of the spreadsheet; and
after generating the fourth output equation, said processor removing the content of the intermediary cells, resulting in the plurality of intermediary results not being identifiable in the spreadsheet, wherein after said removing has been performed, the fourth output equation cannot be reverse engineered to reveal a dependence of the model on said any model input variable of the model.

2. The method of claim 1, wherein said generating the second output equation comprises:
recursively eliminating the at least one second intermediary result from the plurality of first intermediary equations to transform the plurality of first intermediary equations into at least one second intermediary equation that expresses the at least one first intermediary result in terms of the at least one second input data with no dependence on the at least one second intermediary result;
substituting the at least one first intermediary result from the at least one second intermediary equation into the first output equation to generate the second output equation.

3. The method of claim 1, wherein said assigning the plurality of intermediary results comprises:
providing an intermediary result table in the spreadsheet; and
recording the plurality of intermediary results in the intermediary result table, resulting in the intermediary result table specifying relationships between the output data, the intermediary results, all scope input variables whose respective value quantifies a respective scope of the service to be delivered, and all model input variables of the model.

4. The method of claim 1, wherein said generating the second output equation is performed by the computer algebra engine.

5. The method of claim 1,
wherein a plurality of intermediate equations expresses the plurality of intermediate results;
wherein a plurality of interrelated equations consist of the first output equation and the plurality of intermediate equations;
wherein the equations of the plurality of interrelated equations are interrelated in a tree hierarchy in which each equation of the plurality of interrelated equations is a node of the hierarchy at a hierarchical level of the hierarchy;
wherein the intermediary result table comprises a plurality of rows, an Equation column, and a Level column; and
wherein each row of the plurality of rows pertains to a unique equation of the plurality of interrelated equations such that the unique equation is recited in the Equation column and the hierarchical level of the unique equation is recited in the Level column.

6. The method of claim 5, wherein each equation of the plurality of interrelated equations has a type selected from the group consisting of 1, 2, and 3;
wherein the type of the first output equation is 1;
wherein any equation of the plurality of interrelated equations having the type of 2 expresses an intermediate result of the plurality of intermediate results as a function of: one or more scope input variables whose one or more associated values quantify associated scopes of the service to be delivered, no less than one model input variable of the model, and one or more other intermediate results of the plurality of intermediate results;
wherein any equation of the plurality of interrelated equations having the type of 3 expresses another intermediate result of the plurality of intermediate results as a function of: no less than one scope input variable whose value quantifies a related scope of the service to be delivered, more than zero model input variables of the model, and no intermediate results of the plurality of intermediate results;
wherein the intermediary result table further comprises a Type column;
wherein the type of the unique equation of the plurality of interrelated equations in each row is recited in the Type column; and
wherein the types of 1, 2, and 3 are each recited in the Type column.

7. A computer program stored in a memory of a computer system, said computer program comprising instructions that when executed by a processor of a computer system implement a method for hiding sensitive data in an electronic spreadsheet, said method comprising:
providing a first output equation that expresses an output data as a function of at least one scope input variable whose value quantifies a scope of a service to be delivered, at least one model input variable of a model consisting of a cost or pricing model pertaining to the service to be delivered, and at least one first intermediary result, wherein a plurality of first intermediary equations relates the at least one first intermediary result to at least one second intermediary result and one or more model input variables of the model, wherein a plurality of intermediary results denote the at least one first intermediary result and the at least one second intermediary result collectively;
assigning the plurality of intermediary results as content of intermediary cells of the spreadsheet;
generating a second output equation that expresses the output data as a function of the at least one scope input variable, at least one additional scope input variable whose value quantifies an additional scope of the service to be delivered, and a plurality of model input variables of the model, wherein the second output equation has no functional dependence on the plurality of intermediary results, and wherein said generating the second output equation comprises utilizing the first output equation and the plurality of first intermediary equations;
in the generated second output equation, replacing each model input variable of the plurality of model input variables by its value to hide each model input variable of the plurality of model input variables by its value and not replacing any scope input variable of the at least one scope input variable and the at least one additional scope input variable by its value, resulting in a third output equation;
after said replacing, simplifying the third output equation via a computer algebra engine, resulting in a fourth output equation that expresses the output data as a function of the at least one scope input variable and the at least one additional scope input variable, wherein the fourth output equation has no functional dependence on any model input variable of the model;
assigning the output data of the fourth output equation as content of an output cell of the spreadsheet; and
after generating the fourth output equation, removing the content of the intermediary cells, resulting in the plurality of intermediary results not being identifiable in the spreadsheet, wherein after said removing has been performed, the fourth output equation cannot be reverse engineered to reveal a dependence of the model on said any model input variable of the model.

8. The computer program of claim 7, wherein said generating the second output equation comprises:
recursively eliminating the at least one second intermediary result from the plurality of first intermediary equations to transform the plurality of first intermediary equations into at least one second intermediary equation that expresses the at least one first intermediary result in terms of the at least one second input data with no dependence on the at least one second intermediary result;
substituting the at least one first intermediary result from the at least one second intermediary equation into the first output equation to generate the second output equation.

9. The computer program of claim 7, wherein said assigning the plurality of intermediary results comprises:
providing an intermediary result table in the spreadsheet; and
recording the plurality of intermediary results in the intermediary result table, resulting in the intermediary result table specifying relationships between the output data, the intermediary results, all scope input variables whose respective value quantifies a respective scope of the service to be delivered, and all model input variables of the model.

10. The computer program of claim 7, wherein said generating the second output equation is performed by the computer algebra engine.

11. The computer program of claim 7,
wherein a plurality of intermediate equations expresses the plurality of intermediate results;

wherein a plurality of interrelated equations consist of the first output equation and the plurality of intermediate equations;

wherein the equations of the plurality of interrelated equations are interrelated in a tree hierarchy in which each equation of the plurality of interrelated equations is a node of the hierarchy at a hierarchical level of the hierarchy;

wherein the intermediary result table comprises a plurality of rows, an Equation column, and a Level column; and wherein each row of the plurality of rows pertains to a unique equation of the plurality of interrelated equations such that the unique equation is recited in the Equation column and the hierarchical level of the unique equation is recited in the Level column.

12. The computer program of claim 11, wherein each equation of the plurality of interrelated equations has a type selected from the group consisting of 1, 2, and 3;

wherein the type of the first output equation is 1;

wherein any equation of the plurality of interrelated equations having the type of 2 expresses an intermediate result of the plurality of intermediate results as a function of: one or more scope input variables whose one or more associated values quantify associated scopes of the service to be delivered, no less than one model input variable of the model, and one or more other intermediate results of the plurality of intermediate results;

wherein any equation of the plurality of interrelated equations having the type of 3 expresses another intermediate result of the plurality of intermediate results as a function of: no less than one scope input variable whose value quantifies a related scope of the service to be delivered, more than zero model input variables of the model, and no intermediate results of the plurality of intermediate results;

wherein the intermediary result table further comprises a Type column;

wherein the type of the unique equation of the plurality of interrelated equations in each row is recited in the Type column; and wherein the types of 1, 2, and 3 are each recited in the Type column.

13. A computer system comprising a processor and a memory coupled to the processor, said memory containing instructions that when executed by the processor implement a method for hiding sensitive data in an electronic spreadsheet, said method comprising:

providing a first output equation that expresses an output data as a function of at least one scope input variable whose value quantifies a scope of a service to be delivered, at least one model input variable of a model consisting of a cost or pricing model pertaining to the service to be delivered, and at least one first intermediary result, wherein a plurality of first intermediary equations relates the at least one first intermediary result to at least one second intermediary result and one or more model input variables of the model, wherein a plurality of intermediary results denote the at least one first intermediary result and the at least one second intermediary result collectively;

assigning the plurality of intermediary results as content of intermediary cells of the spreadsheet;

generating a second output equation that expresses the output data as a function of the at least one scope input variable, at least one additional scope input variable whose value quantifies an additional scope of the service to be delivered, and a plurality of model input variables of the model, wherein the second output equation has no functional dependence on the plurality of intermediary results, and wherein said generating the second output equation comprises utilizing the first output equation and the plurality of first intermediary equations;

in the generated second output equation, replacing each model input variable of the plurality of model input variables by its value to hide each model input variable of the plurality of model input variables by its value and not replacing any scope input variable of the at least one scope input variable and the at least one additional scope input variable by its value, resulting in a third output equation;

after said replacing, simplifying the third output equation via a computer algebra engine, resulting in a fourth output equation that expresses the output data as a function of the at least one scope input variable and the at least one additional scope input variable, wherein the fourth output equation has no functional dependence on any model input variable of the model;

assigning the output data of the fourth output equation as content of an output cell of the spreadsheet; and after generating the fourth output equation, removing the content of the intermediary cells, resulting in the plurality of intermediary results not being identifiable in the spreadsheet, wherein after said removing has been performed, the fourth output equation cannot be reverse engineered to reveal a dependence of the model on said any model input variable of the model.

14. The computer system of claim 13, wherein said generating the second output equation comprises:

recursively eliminating the at least one second intermediary result from the plurality of first intermediary equations to transform the plurality of first intermediary equations into at least one second intermediary equation that expresses the at least one first intermediary result in terms of the at least one second input data with no dependence on the at least one second intermediary result;

substituting the at least one first intermediary result from the at least one second intermediary equation into the first output equation to generate the second output equation.

15. The computer system of claim 13, wherein said assigning the plurality of intermediary results comprises:

providing an intermediary result table in the spreadsheet; and recording the plurality of intermediary results in the intermediary result table, resulting in the intermediary result table specifying relationships between the output data, the intermediary results, all scope input variables whose respective value quantifies a respective scope of the service to be delivered, and all model input variables of the model.

16. The computer system of claim 13, wherein a plurality of intermediate equations expresses the plurality of intermediate results;

wherein a plurality of interrelated equations consist of the first output equation and the plurality of intermediate equations;

wherein the equations of the plurality of interrelated equations are interrelated in a tree hierarchy in which each equation of the plurality of interrelated equations is a node of the hierarchy at a hierarchical level of the hierarchy;

wherein the intermediary result table comprises a plurality of rows, an Equation column, and a Level column; and wherein each row of the plurality of rows pertains to a unique equation of the plurality of interrelated equations such that the unique equation is recited in the Equation column and the hierarchical level of the unique equation is recited in the Level column.

17. The computer system of claim 16, wherein each equation of the plurality of interrelated equations has a type selected from the group consisting of 1, 2, and 3;

wherein the type of the first output equation is 1;

wherein any equation of the plurality of interrelated equations having the type of 2 expresses an intermediate result of the plurality of intermediate results as a function of: one or more scope input variables whose one or more associated values quantify associated scopes of the service to be delivered, no less than one model input variable of the model, and one or more other intermediate results of the plurality of intermediate results;

wherein any equation of the plurality of interrelated equations having the type of 3 expresses another intermediate result of the plurality of intermediate results as a function of: no less than one scope input variable whose value quantifies a related scope of the service to be delivered, more than zero model input variables of the model, and no intermediate results of the plurality of intermediate results;

wherein the intermediary result table further comprises a Type column;

wherein the type of the unique equation of the plurality of interrelated equations in each row is recited in the Type column; and wherein the types of 1, 2, and 3 are each recited in the Type column.

* * * * *